United States Patent
Glenn

(10) Patent No.: US 10,750,720 B2
(45) Date of Patent: Aug. 25, 2020

(54) DETACHABLE TUGGING PET TOY

(71) Applicant: Stephen Glenn, Bentonville, AR (US)

(72) Inventor: Stephen Glenn, Bentonville, AR (US)

( * ) Notice: Subject to any disclaimer, the term of this patent is extended or adjusted under 35 U.S.C. 154(b) by 159 days.

(21) Appl. No.: 16/120,382

(22) Filed: Sep. 3, 2018

(65) Prior Publication Data
US 2019/0069517 A1     Mar. 7, 2019

Related U.S. Application Data

(60) Provisional application No. 62/554,550, filed on Sep. 5, 2017.

(51) Int. Cl.
*A01K 15/02*     (2006.01)
*A44B 18/00*     (2006.01)

(52) U.S. Cl.
CPC ............ *A01K 15/025* (2013.01); *A44B 18/00* (2013.01)

(58) Field of Classification Search
CPC .... A01K 15/025; A01K 15/026; A01K 15/02; A63H 33/048; A44B 18/00; Y10S 446/901
See application file for complete search history.

(56) References Cited

U.S. PATENT DOCUMENTS

| | | | | |
|---|---|---|---|---|
| 5,282,777 | A * | 2/1994 | Myers | A63B 21/0004 473/576 |
| 5,961,406 | A * | 10/1999 | Hass | A01K 15/025 119/707 |
| 7,878,151 | B2 * | 2/2011 | Tsengas | A01K 15/025 119/707 |
| 2005/0268860 | A1 * | 12/2005 | Ritchey | A01K 15/025 119/706 |
| 2007/0234969 | A1 * | 10/2007 | Lynch | A01K 15/025 119/707 |
| 2008/0146116 | A1 * | 6/2008 | Di Lullo | A01K 15/025 446/297 |
| 2009/0000565 | A1 * | 1/2009 | Bryce | A01K 15/025 119/707 |
| 2014/0230751 | A1 * | 8/2014 | Lamprey, Jr. | A01K 15/025 119/707 |
| 2015/0050861 | A1 * | 2/2015 | Lamprey, Jr. | A63H 5/00 446/397 |
| 2017/0354122 | A1 * | 12/2017 | Watts | A61B 1/00179 |

* cited by examiner

*Primary Examiner* — Trinh T Nguyen

(57) ABSTRACT

A detachable tugging pet toy comprising two elements each having a strap, a gripping means located on one end of said strap, and a fastening means located on one side of said strap, the respective fastening means of each element being complementary to each other. The elements are aligned and attached and then pulled outward via said gripping means until they are fully detached, a process that is satisfying and effortful. The elements are then easily re-attached.

2 Claims, 2 Drawing Sheets

DETACHABLE TUGGING PET TOY

CROSS REFERENCE TO RELATED APPLICATION

This application claims priority to U.S. Ser. No. 62/554,550, filed Sep. 5, 2017 entitled: DETACHABLE TUGGING PET TOY, the contents of which are incorporated herein by reference.

TECHNICAL FIELD

The present invention relates to recreational equipment used to interact with pets.

BACKGROUND OF THE INVENTION

Pet toys come in many varieties, designed for different purposes and the wide ranges of characteristics between and among pets. Dog breeds for example vary widely in size, activity level, chewing habits, and play style. Pet toys include bones, balls, tug toys, training aids, squeaky toys, discs and frisbees, plush toys, sticks, among others.

Toys serve different purposes. Puppies, for instance, need toys they can chew on when they are teething because their gums and jaws become very sore and chewing on things provides them relief. Playing with different toys also encourages exercise, which benefits a pet's overall health. Toys also stimulate pets' minds, discourage problem behavior resulting from boredom and excess energy, and promote dental health.

In the course of play, toys often become damaged or destroyed, either through normal wear and tear or purposeful action by a pet, necessitating the purchase of replacement toys.

Tug of war (also known as war of tug, tug o' war, tug war, rope war, rope pulling, tug rope or tugging war) in the context of pets is a recreational activity that directly pits a pet and its owner against each other in a test of strength: participants pull on opposite ends of an object, the goal being, in some cases, to take the rope from the other participant, and, in others, simply to exercise the pet in a way that is interactive and entertaining for pet and owner. The goal is often exercise because pet and pet-owner are often unable to outright "win" against each other, leading to an unsatisfying stalemate with no clear outcome unless pet or owner forfeits by letting go of their respective end of the object. It can be assumed that a pet is happiest when it feels it has won a tug of war legitimately, and probably happier if there is a sensation of making progress in pulling an object or in pulling it apart. A pet owner is happiest when a pet is exercised without damaging or destroying any objects in the course of play.

No product exists which allows a pet and pet owner to engage in a satisfying and productive game of tug of war with a feeling of progression and a clear goal or outcome, can be adjusted to suit different pets, and can be pulled apart without being damaged.

What is desired is an article of recreational equipment which can be repeatedly pulled apart without being damaged, allows for discernible progress to be made toward that end over a short period of time by having intermediate states between full attachment and full detachment and providing tangible, visual and audible indications of said progress, can be adjusted to strength levels suitable to different pets, and can be easily and repeatedly reattached after detachment. The present invention provides such an article.

SUMMARY OF THE INVENTION

According to one embodiment of the present invention, the detachable tugging pet toy comprises two elements, each comprising a strap being a length of durable, flexible material such as nylon and a gripping means such as a handle or loop of braided rope. Said elements additionally comprise corresponding detachable fastening means which allow them to be detachably secured to each other and markings indicating suggested lengths of overlap of said fastening means suitable for differently-sized pets.

In one embodiment, said detachable fastening means are a hook-and-loop-type fastening means comprising two complementary surfaces, one having hooks and the other having loops. Said fastening means complementary surfaces are positioned on their respective straps and can be detachably secured by overlapping some portion of said complementary surfaces and pressing them together. A larger area of overlap of said surfaces requires more strength and effort to detach.

In one configuration, the invention can be used by orienting the elements such that their straps are aligned with each other and overlapping, their respective gripping means are at opposite ends, their respective fastening means complementary surfaces are facing each other and in contact, and then overlapping a chosen length of said surfaces and attaching by pressing them together. The elements can then be detached by pulling said gripping means outward in opposing directions, by a user or users, or by a pet and owner.

To those skilled in the art to which this invention relates, many changes in construction and widely differing embodiments and applications of the invention will suggest themselves without departing from the scope of the invention as defined herein. The disclosures and the descriptions herein are purely illustrative and are not intended to be in any sense limiting.

BRIEF DESCRIPTION OF THE DRAWINGS

For a better understanding of the present invention including the features, advantages and embodiments, reference is made to the following detailed description along with accompanying Figures, in which.

DETAILED DESCRIPTION

Figure 1:
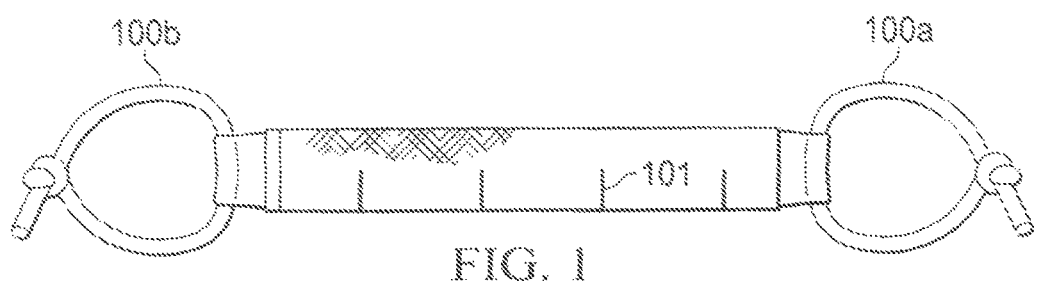
FIG. 1 is a top-view of a detachable tugging pet toy in accordance with the present invention in a fully attached configuration.

While the making and using of the disclosed embodiments of the present invention is discussed in detail below, it should be appreciated that the present invention provides many applicable inventive concepts which can be embodied in a wide variety of contexts. Some features of the preferred embodiments shown and discussed may be simplified or exaggerated for illustrating the principles of the invention.

According to one embodiment of the present invention and referring to the included Figures, the detachable tugging pet toy comprises two elements, respectively element A 200a and element B 200b, each comprising a strap 203a and 203b respectively of durable, flexible material such as nylon or rope and having a length of between 6 and 25 inches and a width of between 2 and 4 inches, and defining for elements A and B respectively gripping ends 300a and 300b on one strap terminal end, free ends 301a and 301b on the remaining strap terminal end, attaching sides 303 and 201 (associated with elements A and B respectively) between said gripping and free ends, and non-attaching sides 202 and 400 (associated with elements A and B respectively) between said gripping and free ends and directly opposite said attaching, each of said elements further comprising a rigid or flexible gripping means, respectively for elements A and B gripping means 100a and 100b located on each said corresponding gripping end 300a and 300b, such as a handle or loop of braided rope. Said elements A 200a and B 200b additionally comprise corresponding detachable fastening means (302a and 302b being the fastening means of element A and the corresponding fastening means of element B, respectively) which allow them to be detachably secured to each other, said means being located on the respective attaching sides 303 and 201 of their respective straps, having dimensions at most as long as and as wide as their respective straps and being positioned so that they do not extend outside the attaching sides of said respective straps, being contained entirely within the same; said elements further comprise sets of markings (101 and 401 being the sets of markings of elements A and B respectively) indicating suggested lengths of overlap of said fastening means suitable for differently-sized pets and each requiring a different level of strength to pull apart, each respective said set of markings 101 and 401 being located on the respective non-attaching side 202 and 400 of its respective strap 203a and 203b.

In one embodiment, said detachable fastening means are a hook-and-loop-type fastening means comprising two complementary surfaces, one having hooks and the other having loops. In one embodiment of the present invention, element A 200a comprises a fastening means surface 302a having hooks and element B 200b comprises a fastening means surface 302b having loops. Said fastening means complementary surfaces are positioned on the attaching sides 303 and 201 of their respective straps 203a and 203b, dimensioned at most as long as the length of and as wide as the width of said straps, and can be detachably secured by positioning said complementary surfaces so that they are facing each other and some portion of said surfaces are overlapping and pressing them together such that said hooks and loops engage. The size of the resulting engaged area determines how much force and effort are required to disengage said elements and can be varied by positioning the straps collinearly and attaching the same with said gripping means being closer together or farther apart, by arranging said straps at angles to each other so that said fastening means do not completely overlap, or by not engaging the entirety of said overlapping area.

In another embodiment of the present invention, element A comprises a fastening means surface having loops and element B comprises a fastening means surface having hooks.

In a further embodiment, said elements A and B each comprise a combination of surfaces having hooks and surfaces having loops.

Figure 2:
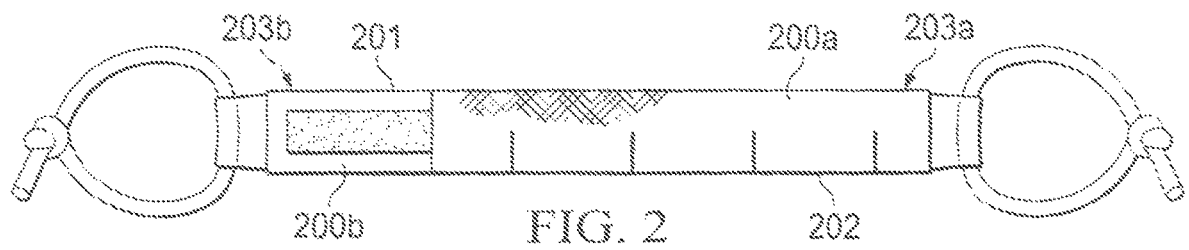
FIG. 2 is a top-view of a detachable tugging pet toy in accordance with the present invention in a partially detached configuration, being either an intermediate stage of detachment or an initial configuration providing a lower resistive force.
Figure 3:
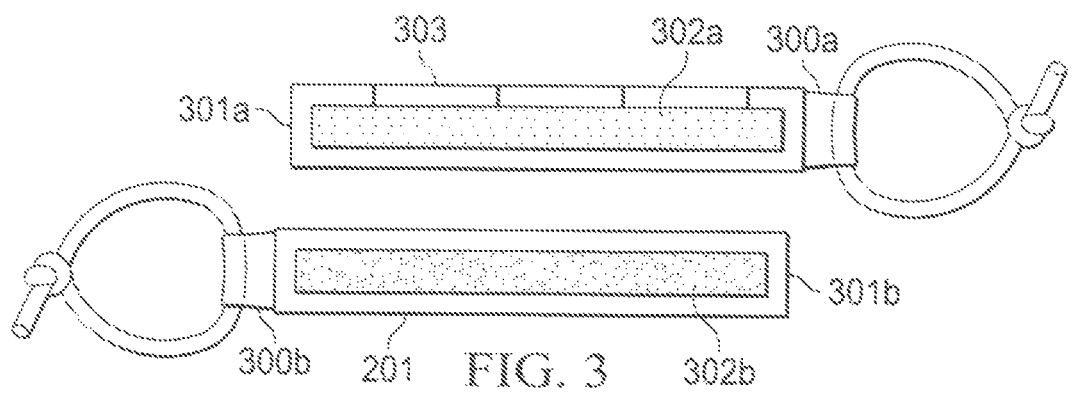
FIG. 3 is a top-view of a detachable tugging pet toy in accordance with the present invention in a fully detached configuration, with the respective attaching sides of each element visible.

In one configuration, FIGS. 1 and 2, the invention can be used by orienting the elements 200a and 200b such that their straps 203a and 203b respectively are collinear, anti-parallel and overlapping, their respective gripping means 100a and 100b are at opposite ends, their respective fastening means complementary surfaces 302a and 302b are facing each other and in contact, and then overlapping a chosen length of said surfaces and attaching by pressing them together. The elements can then be detached by pulling said gripping means outward in opposing directions, by a user or users, or by a pet and owner. In this configuration, the pulling or detaching force is oriented longitudinally outward along said elements and said fastening surfaces are thus pulled past each other, providing much more resistive force than if they were peeled away from each other, as, in this configuration, not only can said surfaces re-engage as they are pulled due to changing attachment surface areas, the detaching force must overcome the attachment force over the entire engaged surface area simultaneously.

Figure 4:
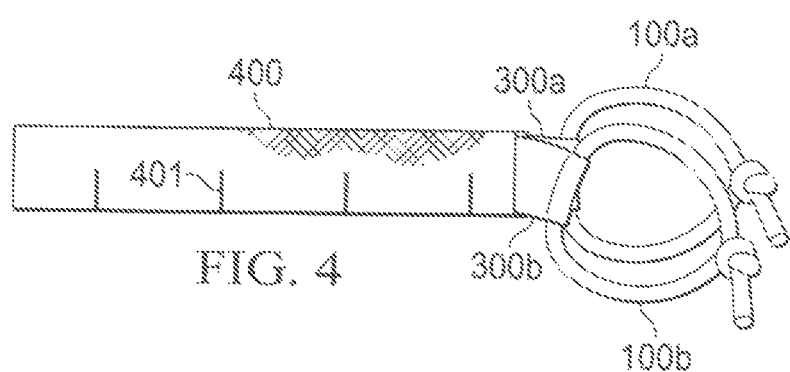
FIG. 4 is a top-view of a detachable tugging pet toy in accordance with the present invention, fully attached in an alternate configuration.

In another configuration, FIG. 4, the invention is used by orienting the elements such that their straps are collinear, parallel, and overlapping, with their respective gripping means at the same end (said elements being oriented in the same direction) and their respective fastening means surfaces facing each other and overlapping. The fastening surfaces are then engaged by pressing them together and detached by gripping said gripping means and pulling the same outward and away from each other. In this configuration, because the pulling force is located only at one end of said elements, said fastening means surfaces are peeled apart, the detachment beginning at the gripping ends and propagating toward the free ends of said elements. This detachment mode offers much less resistance than the longitudinal mode discussed above, as the detaching force need only overcome a very small attaching surface area at any given time, with said area eventually propagating through the entire attached length.

Said configurations allow a pet and owner, or one or more users, to engage in a game of tug of war having intermediate states between fully attached and fully detached in which said fastening means are periodically sliding and re-engaging, in which feedback about progress is provided visually by the remaining engaged fastening means surface area, tangibly by the increasing distance between the gripping means of elements A and B, respectively, and audibly by the "tearing" noise associated with detachment of said hook-and-loop-type fastening means, and in which a clear goal or outcome—that of fully detaching said elements—is effortful, achievable, and satisfying.

The embodiments shown and described above are only exemplary. Even though numerous characteristics and advantages of the present invention have been set forth in the foregoing description together with details of the circuits and methods of the present invention, the disclosure is illustrative only and changes may be made within the principles of the invention to the full extent indicated by the broad general meaning of the terms used herein. Various alterations, modifications and substitutions can be made to the circuits and methods of the disclosed invention and the fabrication system that implements the present invention without departing in any way from the spirit and scope of the invention.

What is claimed is:

1. A detachable tugging pet toy, comprising:
   two complementary elements, each of said elements further comprising a strap having a length longer than its width and defining one terminal end of said strap as the gripping end, the opposite end as the free end, and the two faces of the strap as the attaching and non-attaching sides;
   a gripping mechanism securely fixed to the associated gripping end of the associated strap, said gripping mechanism being operable by a human or pet to securely grip the associated element while separating said elements by pulling; and
   a detachable fastening mechanism on the associated attaching side of the associated strap, said elements being thus substantially identical except for having complementary fastening mechanisms to each other wherein in which each of said straps further comprises on its associated non-attaching side a set of markings corresponding to the area of overlap of the attaching sides of said elements and roughly indicating the difficulty of pulling apart said elements based on said overlap, thus allowing for consistent setting of the level of difficulty.

2. A detachable tugging pet toy comprising two substantially identical elements, each element comprising:
   a strap being made of a durable, flexible material such as nylon and defining a gripping end on one strap terminal end, a free end on the remaining strap terminal end, an attaching side between said ends, and a non-attaching side between said ends and directly opposite said attaching side;
   a gripping mechanism located on said gripping end such as a loop of braided rope;
   a detachable fastening mechanism being located on the attaching side of said strap and corresponding to the detachable fastening means of the complementary element, said fastening mechanism being a hook and loop type fastening system comprising a surface having a plurality of hooks and being located on the attaching side of one element and a surface having a plurality of loops and being located on the attaching side of the remaining element such that when said elements are oriented with their attaching sides facing each other and pressed together said hooks engage said loops and said elements are detachably fastened to each other;
   a set of markings on its non-attaching side indicating suggested lengths of overlap of said fastening means roughly indicating the difficulty of pulling apart said elements based on said overlap, thus allowing for consistent setting of the level of difficulty.

* * * * *